Nov. 19, 1935.  C. O. ENGSTROM  2,021,445
DENTAL INSTRUMENT
Filed April 16, 1934
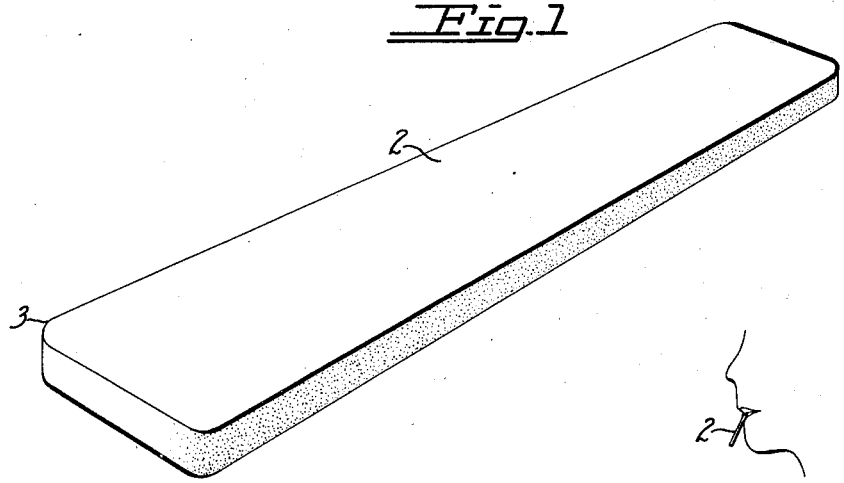
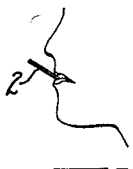
INVENTOR.
CARL O. ENGSTROM.
BY Charles L. Evans
HIS ATTORNEY.

Patented Nov. 19, 1935

2,021,445

UNITED STATES PATENT OFFICE 2,021,445

DENTAL INSTRUMENT

Carl O. Engstrom, Sacramento, Calif.

Application April 16, 1934, Serial No. 720,685

1 Claim. (Cl. 128—25)

The invention relates to dentistry and particularly to a device for use in orthodontia.

An object of the invention is to provide a dental instrument the use of which improves the growth, position, development and health of the teeth and their supporting structure.

Another object of the invention is the provision of a dental instrument the use of which tends to correct mouth breathing.

A further object of the invention is the provision of a dental instrument for administering small doses of medicaments to aid in correcting local or systemic difficulties.

Another object of the invention is the provision of a dental instrument to induce the proper posture, use, growth and development of the mandible or inferior maxillary.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawing:

Figure 1 is a perspective view of the dental instrument shown in an enlarged scale.

Figures 2, 3 and 4 show different positions of use of the instrument in the mouth of a patient.

In the development of orthodontia it has been found that the amount of bone and supporting tissues surrounding the teeth, the proper occlusion of the teeth, and the correct posture of the inferior maxillary depend largely upon the habitual use to which the teeth are put. Teeth accustomed to little use have weak and poorly developed supporting structures and are capable of resisting comparatively little pressure. On the other hand teeth accustomed to powerful use have supporting structures of like character and are capable of resisting great pressure. Present day food habits do not give the teeth, particularly the anterior ones, sufficient use to properly develop them and their supporting structure so that the need of a device to give additional or corrective use is obvious.

Broadly my invention comprises a strip of fibrous material which reacts under chewing to form a loosely compacted mass of fibers which resists considerable pressure in biting. While the strip withstands prolonged maceration the soft character of the fibers does not injure the enamel. Pleasing flavors or medicaments may be added to increase the usefulness of the device and if desired a color may be included to improve the appearance.

In greater detail the dental instrument of my invention comprises a strip 2 of suitable fibrous material, preferably a fine grain wood such as bass or poplar. It is of course possible to use other woods or a fabricated material if it is so constructed that it may be compressed or dissociated into fibers and macerated without the fibers becoming detached. The material must be able to withstand considerable pressure in biting without being hard enough to injure the enamel of the teeth. My product is conveniently manufactured at a minimum cost when the two woods mentioned are utilized. The corners 3 are preferably rounded to prevent injury to the gums.

The strip or stick must be long enough to permit easy handling with either hands or lips, and to protrude from the mouth as shown in Figures 2, 3 and 4. I have found that a length of one and three-fourths to two inches gives satisfactory results. The width limits the number of teeth that can be used at one time in biting the stick and since it is frequently desirable to treat only one tooth I prefer a width of approximately one-fourth of an inch. A thickness of about one-sixteenth of an inch is usually sufficient to resist a complete incision in one bite.

The use of this instrument is recommended in orthodontia particularly when the patient is a child. To promote the full eruption of the teeth into occlusion, and to improve the growth, development and health of the teeth and their supporting structure, the patient is instructed to bite the stick making a direct incisal bite in the manner shown in Figure 2. This biting should be continued using only the anterior teeth until the stick has become a loosely compacted mass of parallel fibers resembling a brush. Present day food habits place most of the work of chewing on the posterior teeth and frequently the supporting structures of the anterior teeth are not properly developed. My dental instrument has been designed to aid in the correction of this fault. It is possible to correct mal-occlusion of the teeth by the proper use of my instrument and particularly when used in conjunction with an orthodontic appliance. Since each case presents different problems individual instructions are required.

The correct posture of the mandible or lower jaw may be induced and its growth and development aided by the use of this instrument. In cases of distal relation the patient is instructed to make a direct incisal bite on one end of the stick which extends horizontally from the mouth as shown in Figure 2, then move the lower jaw forwardly while maintaining the pressure on the stick which then extends upwardly at an angle, as shown in Figure 3. This action is repeated until the fibers of the stick begin to break off.

If a case of mesial relation is to be treated the first position is the same as for distal relation but the second position is obtained by moving the lower jaw backwardly as far as possible so that the stick extends downwardly into the position shown in Figure 4. This action is repeated until the fibers of the instrument begin to break down.

Another use of importance to which this dental instrument may be put is that of improving the posture and use of the lips and developing their contiguous muscular structures. A more harmonious form and healthier appearance of the lips will result if the exercise of moving the stick from one side of the mouth to the other, or moving the stick in and out with the lips alone is practiced regularly. In this exercise the hand should not be used at all unless a leverage action is desired. Other abnormal habits of the teeth, tongue and surrounding structures may be corrected or improved by the proper use of my instrument.

Probably one of the most difficult habits to break is that of mouth breathing. A patient while using my dental appliance is forced to breathe through his nose and in many cases this habit will be corrected without conscious effort on his part.

It is often difficult to interest and teach a child to use a device of this character. I have found that little opposition is encountered if the instrument is treated with some pleasant flavoring such as peppermint, spearmint, wintergreen or other suitable material, and sweetened with sugar, saccharin or other like material. So treated it is used by the child in place of chewing gum or candy and the exercises become a game to him.

Medicaments may also be added for various treatments. For example thymol is added as an antiseptic; pepsin or peppermint as a digestive aid; or menthol to clear the respiratory passages. Many other medicaments, and in some instances more than one may be used to improve or correct conditions in the buccal cavity or benefit the functioning of the pharynx, stomach or system generally. A drug may be carried in the instrument as a treatment for halitosis or to stimulate salivary glands.

The attractiveness of the appearance of the product may be enhanced by coloring the sticks so that each flavor or medicament may be readily recognized by a color.

The flavorings, medicaments and coloring materials may be injected into the fiber of the sticks in any suitable manner such as in a pressure cooker or in a vacuum. I have procured satisfactory results by placing the sticks to be treated in a solution of water, gelatine, saccharin and the desired flavoring or medicaments, which in turn is treated in a pressure cooker at fifteen pounds for forty-five minutes. The gelatine aids in fixing and holding the flavoring and medicaments.

After being saturated or impregnated with the desired materials the sticks are preferably packed or wrapped in air-tight packages to preserve the flavor and medicine.

I claim:

A dental instrument comprising a flat strip of straight-grained soft wood, the grain of which is generally lengthwise of the strip, the strip having a width approximately that of the tooth to be treated and being of such dimensions and strength as adapt it to be interposed as a lever between opposed but misaligned teeth and to bear without breaking the moderate pressure of the fingers near one end in opposition to the pressure of the teeth near the other end, the strip being impregnated with flavoring material.

CARL O. ENGSTROM.